United States Patent
Choi et al.

(10) Patent No.: US 12,542,304 B2
(45) Date of Patent: Feb. 3, 2026

(54) ANODE, LITHIUM METAL BATTERY INCLUDING THE SAME, AND METHOD OF MANUFACTURING THE LITHIUM METAL BATTERY

(71) Applicant: AGENCY FOR DEFENSE DEVELOPMENT, Daejeon (KR)

(72) Inventors: Yusong Choi, Daejeon (KR); Tae Young Ahn, Daejeon (KR); SangHyeon Ha, Daejeon (KR); Jae Seong Yeo, Daejeon (KR); EunJi Yoo, Daejeon (KR); Jae In Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 76 days.

(21) Appl. No.: 18/813,060

(22) Filed: Aug. 23, 2024

(65) Prior Publication Data
US 2025/0070271 A1  Feb. 27, 2025

(30) Foreign Application Priority Data
Aug. 25, 2023  (KR) .......................... 10-2023-0112318

(51) Int. Cl.
*H01M 10/052*  (2010.01)
*H01M 4/04*    (2006.01)
(Continued)

(52) U.S. Cl.
CPC ......... *H01M 10/26* (2013.01); *H01M 4/0428* (2013.01); *H01M 4/0471* (2013.01); *H01M 4/382* (2013.01); *H01M 4/808* (2013.01); *H01M 10/049* (2013.01); *H01M 10/052* (2013.01); *H01M 10/0569* (2013.01); *H01M 50/609* (2021.01); *H01M 2004/027* (2013.01);
(Continued)

(58) Field of Classification Search
CPC .. H01M 10/26; H01M 10/049; H01M 10/052; H01M 10/0569; H01M 50/609; H01M 4/0428; H01M 4/0471; H01M 4/382; H01M 4/808
See application file for complete search history.

(56) References Cited

U.S. PATENT DOCUMENTS

2012/0264022 A1  10/2012  Hosoe et al.
2013/0010401 A1   1/2013  Hosoe et al.
(Continued)

FOREIGN PATENT DOCUMENTS

KR   20140005957   1/2014
KR   1020150016730  2/2015
(Continued)

OTHER PUBLICATIONS

"Office Action of Korea Counterpart Application No. 10-2023-0112318", issued on Sep. 21, 2023, with English translation thereof, p. 1-p. 16.
(Continued)

*Primary Examiner* — Osei K Amponsah
(74) *Attorney, Agent, or Firm* — JCIPRNET

(57) ABSTRACT

Provided is an anode including a metal porous body having a foam structure, a lithium-philic film formed on a surface of the metal porous body, and lithium impregnated into pores of the metal porous body.

9 Claims, 8 Drawing Sheets

(51) Int. Cl.
*H01M 4/38* (2006.01)
*H01M 4/80* (2006.01)
*H01M 10/04* (2006.01)
*H01M 10/0569* (2010.01)
*H01M 10/26* (2006.01)
*H01M 50/609* (2021.01)
*H01M 4/02* (2006.01)

(52) U.S. Cl.
CPC ............... *H01M 2300/0002* (2013.01); *H01M 2300/0028* (2013.01)

(56) References Cited

U.S. PATENT DOCUMENTS

| | | |
|---|---|---|
| 2015/0037692 A1 | 2/2015 | Park et al. |
| 2016/0190606 A1 | 6/2016 | Kim et al. |
| 2018/0277903 A1 | 9/2018 | Xu et al. |
| 2020/0153049 A1* | 5/2020 | Kwak ............... H01G 11/22 |
| 2020/0251779 A1* | 8/2020 | Xu ............... H01G 11/86 |
| 2020/0411907 A1* | 12/2020 | Park ............... H01M 10/0565 |
| 2022/0293916 A1 | 9/2022 | Choi et al. |
| 2023/0178811 A1 | 6/2023 | Park et al. |

FOREIGN PATENT DOCUMENTS

| | | |
|---|---|---|
| KR | 101632793 | 6/2016 |
| KR | 101738769 | 5/2017 |
| KR | 101809066 | 1/2018 |
| KR | 1020180105631 | 9/2018 |
| KR | 1020210042780 | 4/2021 |
| KR | 1020220058026 | 5/2022 |

OTHER PUBLICATIONS

"Office Action of Korea Counterpart Application No. 10-2023-0112318", issued on Dec. 26, 2023, with English translation thereof, p. 1-p. 6.

"Written Decision on Registration of Korea Counterpart Application No. 10-2023-0112318", issued on Jun. 24, 2024, with English translation thereof, p. 1-p. 11.

Yusong Choi et al., "Electrochemical properties of a lithium-impregnated metal foam anode (LIMFA FeCrAl) for molten salt thermal batteries", Scientific Reports, Mar. 2022, pp. 1-7.

* cited by examiner

ANODE, LITHIUM METAL BATTERY INCLUDING THE SAME, AND METHOD OF MANUFACTURING THE LITHIUM METAL BATTERY

CROSS-REFERENCE TO RELATED APPLICATION

This application is based on and claims priority under 35 U.S.C. § 119 to Korean Patent Application No. 10-2023-0112318, filed on Aug. 25, 2023, in the Korean Intellectual Property Office, the disclosure of which is incorporated by reference herein in its entirety.

BACKGROUND

1. Field

The present disclosure relates to an anode, a lithium metal battery including the same, and a method of manufacturing the lithium metal battery. Specifically, the present disclosure relates to an anode including a metal porous body having a lithium-philic film formed on a surface thereof, a lithium metal battery including the anode, and a method of manufacturing the lithium metal battery.

2. Description of the Related Art

The anode of lithium batteries, which has been widely used in the past, is a carbon-based anode with a specific energy of about 372 mAh/g. To overcome the limitations of carbon-based anodes, much research and effort have been conducted to use pure lithium, which has a specific energy (3860 mAh/g) about 10 times that of carbon-based anodes and may maximize a potential difference with the anode. Also, research has been conducted on using silicon in addition to lithium.

Currently, when using pure lithium as an anode material for lithium metal batteries, a method in which the anode is manufactured as thin as possible and then combined with a current collector is used to maximize energy density.

As another approach to lithium metal batteries, instead of using pure lithium for an anode, an anode-free lithium metal battery has also been studied, in which, after an anode current collector is prepared, lithium included in a cathode is deposited on the anode current collector during a charging process, and then the lithium deposited on the anode current collector moves to the cathode during discharge.

In the case of pure lithium, safety problems such as volume expansion of the anode during charging and discharging, the occurrence of dendrite during charging and discharging, or performance degradation due to dead lithium have not been resolved yet.

Lithium metal has a relatively low melting point. Therefore, when lithium metal batteries using pure lithium are exposed to a high temperature environment, an explosion may occur due to melting and reacting of the lithium metal with other components or mixing with the cathode, which causes a short circuit, and thus, may cause damage to a facility and loss of life.

However, research to date has focused on separators or protection circuits that prevent short circuits, and there is a lack of countermeasures for the worst-case scenario when the lithium metal anode melts.

Similarly, silicon anodes have not yet been commercialized due to safety issues caused by volume expansion, or problems such as reduced lifespan and cycle characteristics caused by side reactions.

In addition, in the case of electrolytes, liquid organic electrolytes are mostly used due to their low cost and proven charge/discharge characteristics, but organic electrolytes may cause problems such as ignition or vaporization at a high temperature and short-circuiting electrodes causing explosions.

To solve the problems of organic electrolytes, active research on solid electrolytes has been conducted, but commercialization has not yet been achieved due to the limitations of the operating environment of solid electrolytes, complex manufacturing process, cost, and low ionic conductivity compared to organic electrolytes.

In the case of aqueous electrolytes, they have low costs and are environmentally friendly and highly stable. However, the electrochemical stability window (ESW) of aqueous electrolytes is limited to ~1.23 V, which is the decomposition voltage of water. Therefore, the use of aqueous electrolytes has not led to obtaining the performance required by the industry.

SUMMARY

Provide is a lithium metal battery including a lithium metal electrode impregnated with lithium into a metal porous body and an aqueous electrolyte and a method of manufacturing the lithium metal battery.

The problems to be solved by the technical spirit of the disclosure are not limited to the problems mentioned above, and other problems not mentioned will be clearly understood by those skilled in the art from the following description.

Additional aspects will be set forth in part in the description which follows and, in part, will be apparent from the description, or may be learned by practice of the presented embodiments of the disclosure.

According to one or more embodiments, there is provided an anode including a metal porous body having a foam structure, a lithium-philic film formed on a surface of the metal porous body, and lithium impregnated into pores of the metal porous body.

An average size of the pores may be in a range from about 10 μm or to about 3000 μm.

The metal porous body may include at least one of nickel, chromium, aluminum, iron, and molybdenum.

The metal porous body may include nickel in a range from about 20 wt % to about 50 wt %, iron in a range from about 5 wt % to about 20 wt %, chromium in a range from about 15 wt % to about 35 wt %, and aluminum in a range from about 10 wt % to about 30 wt % based on the total weight of the metal porous body.

The metal porous body may include nickel in a range from about 40 wt % to about 55 wt %, chromium in a range from about 20 wt % to about 30 wt %, and aluminum in a range from about 20 wt % to about 30 wt % based on the total weight of the metal porous body.

An average size of the pores may be in a range from about 200 μm to about 600 μm.

The lithium-philic film may include at least one of oxide, silicon, aluminum, or gold.

The lithium-philic film may include elements included in the metal porous body.

The lithium-philic film may be formed by using heat treatment, plasma deposition, or chemical vapor deposition.

According to one or more embodiments, there is provided a lithium metal battery including an anode and a cathode, a separator disposed between the anode and the cathode, and an electrolyte impregnated in all or part of the anode, the cathode, and the separator, wherein the anode may include a metal porous body having a foam structure, a lithium-philic film formed on a surface of the metal porous body, and lithium impregnated into pores of the metal porous body.

The electrolyte may include an organic solvent of EC:EMC (1:1 vol %) and a lithium salt.

The electrolyte may further include vinylene carbonate and fluoroethylene carbonate.

The electrolyte may include LiTFSI in a range from about 70 wt % to about 80 wt %, LiOTf in a range from about 10 wt % to about 20 wt %, and water in a range from about 10 wt % to about 20 wt % based on the total weight of the electrolyte.

The electrolyte may include LiTFSI in a range from about 70 wt % to about 80 wt %, DMC in a range from about 10 wt % to about 20 wt %, and water in a range from about 5 wt % to about 15 wt % based on the total weight of the electrolyte.

The electrolyte may include LiTFSI in a range from about 70 wt % to about 80 wt %, TMP in a range from about 15 wt % to about 25 wt %, and water in a range from about wt % to about 10 wt % based on the total weight of the electrolyte.

The electrolyte may include LiTFSI in a range from about 40 wt % to about 60 wt %, LiOTf in a range from about 5 wt % to about 15 wt %, EMIM-TFSI in a range from about 30 wt % to about 40 wt %, and water in a range from about 5 wt % to about 15 wt % based on the total weight of the electrolyte.

The lithium metal battery may further include an anode current collector arranged on one side of the anode, wherein the anode current collector may include titanium.

According to one or more embodiments, there is provided a method of manufacturing a lithium metal battery, the method including manufacturing an anode, manufacturing a cathode, manufacturing a separator; and assembling the manufactured the anode, the cathode, and the separator and injecting an electrolyte, wherein the manufacturing of the anode may include manufacturing a metal porous body, forming a lithium-philic film on a surface of the metal porous body, and impregnating the metal porous body with molten lithium.

The metal porous body may be heat treated at a temperature in a range from about 400° C. to about 900° C. to form the lithium-philic film.

The lithium-philic film may be formed using plasma deposition or chemical vapor deposition.

Other aspects, features and advantages other than those described above will become apparent from the following drawings, claims and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
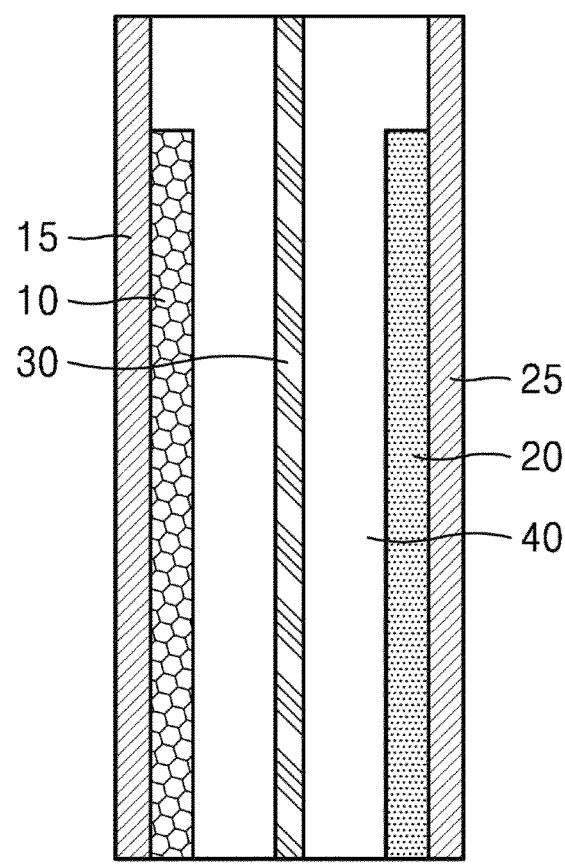
FIG. 1 is a schematic cross-sectional view of a structure of a lithium metal battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The inventive concept may be modified into various forms and may have various embodiments. In this regards, the disclosure will now be made in detail to embodiments, examples of which are illustrated in the accompanying drawings. The advantages, features, and methods of achieving the advantages may be clear when referring to the embodiments described below together with the drawings. However, the inventive concept may have different forms and should not be construed as being limited to the descriptions set forth herein.

Hereinafter, the disclosure will be described more fully with reference to the accompanying drawings, in which embodiments of the disclosure are shown. In describing the disclosure with reference to drawings, like reference numerals are used for elements that are substantially identical or correspond to each other, and the descriptions thereof are not repeated.

In the specification, the terms first, second, etc. are not used in a restrictive sense but are used for the purpose of distinguishing one component from another.

In the specification, the singular forms include the plural forms unless the context clearly indicates otherwise.

In the specification, the terms "comprises" and/or "comprising," when used in this specification, specify the presence of stated features or constituent elements but do not preclude the presence or addition of one or more other features or constituent elements.

In the specification, when a film, a region, a constituent element is referred to as being "on" or "above" another element, the film, the region, or the constituent element may be in direct contact with the other element or other intervening film, region, or constituent element may be present.

In the specification, when a film, a region, a constituent element, etc. are connected, it may include a case when a film, a region, a constituent element is directly connected or/and a case when the film, the region, and the components are indirectly connected by intervening another film, a region, a constituent element therebetween. For example, in the specification, when a film, a region, a constituent element, etc. are electrically connected, it may represent when a film, region, constituent element, etc. are directly electrically connected, and/or another film, region, component, etc. are indirectly electrically connected by intervening another film, region, constituent element, etc. there between.

In the specification, "A and/or B" indicates either A, B, or both A and B. And "at least one of A and B" indicates a case when it is A, or B, or both A and B.

The x-axis, the y-axis and the z-axis are not limited to three axes of the rectangular coordinate system, and may be interpreted in a broader sense For example, the x-axis, the y-axis, and the z-axis may be perpendicular to one another, or may represent different directions that are not perpendicular to one another.

In the specification, the terms "about" or "approximately" used herein to refer to any numerical value may mean including values within a range generally accepted in the art due to measurement limitations or errors, etc. For example, "about" may denote including values within a range of ±30%, ±20%, ±10%, or ±5% of any numerical value.

In the specification, "the configuration of B is directly arranged on the configuration of A" may demote that no additional adhesive layer or adhesive member is arranged between the configuration of A and the configuration of B. At this time, the configuration of B may be formed through a continuous process on a base surface provided by the configuration of A after the configuration of A is formed.

In the specification, "A and B overlap" may denote that when a plane (e.g., an xy plane) perpendicular to a direction is viewed from the direction (e.g., a z-axis direction), at least a part of A and at least a part of B are arranged to overlap on the plane.

In the specification, when a certain embodiment may be implemented differently, a specific process order may be performed differently from the described order For example, two consecutively described processes may be performed substantially at the same time or performed in an order opposite to the described order In the drawings, sizes of components may be exaggerated or reduced for convenience of explanation For example, because sizes and thicknesses of components in the drawings are arbitrarily illustrated for convenience of explanation, following embodiments are not limited thereto.

FIG. 1 is a schematic cross-sectional view showing a structure of a lithium metal battery 1 according to an embodiment; Referring to FIG. 1, the lithium metal battery 1 according to an embodiment may include an anode 10, an anode current collector 15, a cathode 20, a cathode current collector 25, a separator 30, and an electrolyte 40.

The anode 10 according to an embodiment may include a metal porous body having a lithium-philic film formed on a surface thereof and lithium impregnated in pores thereof.

Figure 2:
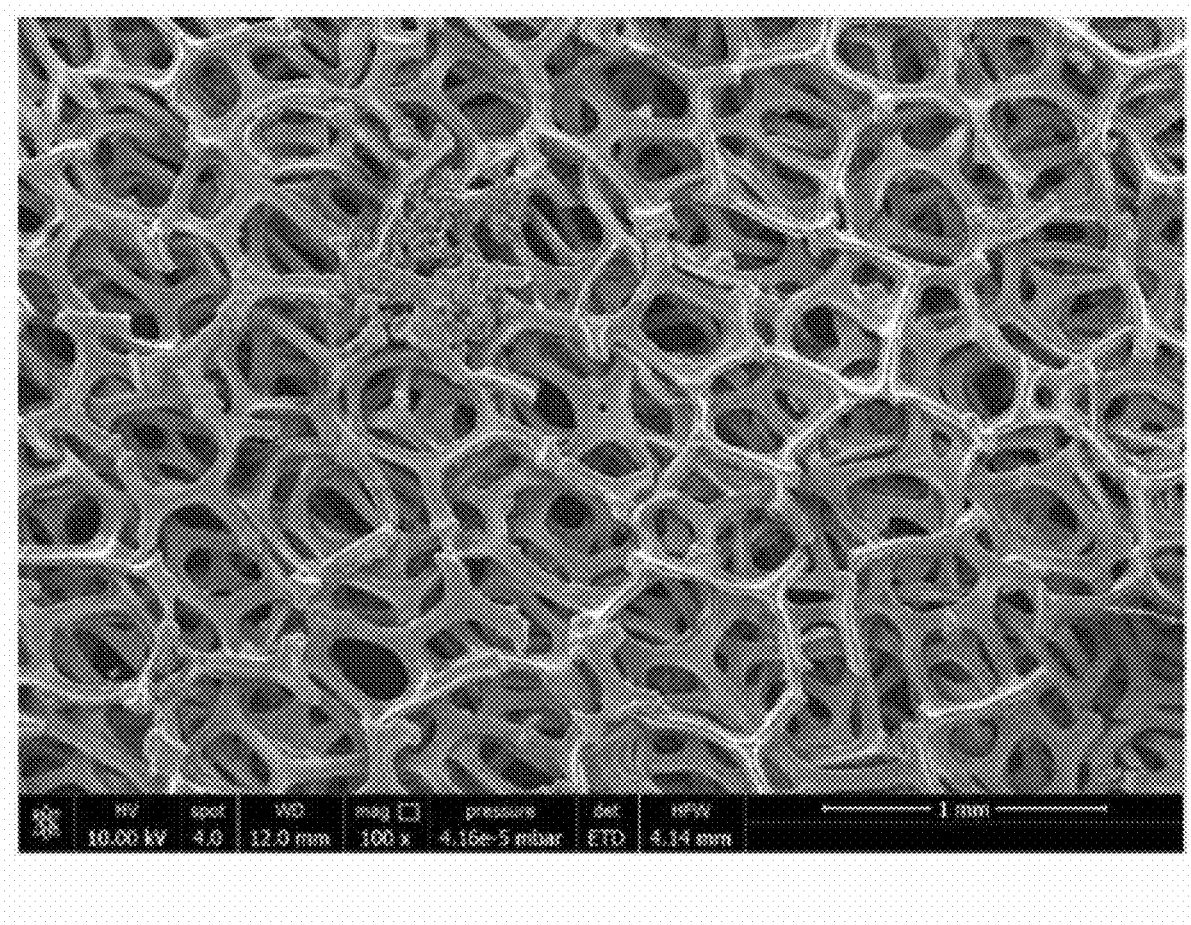
FIG. 2 is a diagram showing a structure of a metal porous body according to an embodiment.

FIG. 2 is a diagram showing a structure of a metal porous body according to an embodiment. Referring to FIG. 2, the metal porous body according to an embodiment may have a mesh or foam structure.

At this time, an average size of the pores of the metal porous body may be in a range from about 10 μm to about 3,000 μm. The average size of the pores may vary depending on a material included in the metal porous body.

The metal porous body may have corrosion resistance to lithium. For example, the metal porous body may include at least one of nickel, chromium, aluminum, iron, and molybdenum.

In one embodiment, the metal porous body may include nickel, iron, chromium, and aluminum. In this case, the metal porous body may include nickel in a range from about 20 wt % to about 50 wt %, iron in a range from about 5 wt % to about 20 wt %, chromium in a range from about 15 wt % to about 35 wt %, and aluminum in a range from about 10 wt % to about 30 wt % based on the total weight of the metal porous body.

In one embodiment, the metal porous body may include nickel, chromium, and aluminum. In this case, the metal porous body may include nickel in a range from about 40 wt % to about 55 wt % of, chromium in a range from about 20 wt % to about 30 wt % of, and aluminum in a range from about 20 wt % to about 30 wt % of based on the total weight of the metal porous body. In one embodiment, if the metal porous body includes nickel, chromium, and aluminum, the average size of the pores of the metal porous body may be in a range from about 200 μm to about 600 μm.

In one embodiment, a lithium-philic film may be formed on a surface of the metal porous body.

In order to manufacture the anode 10, lithium may be impregnated into the metal porous body, and at this time, in order to improve the impregnation characteristics of lithium, it is preferable that the surface of the metal porous body has lithium-philic characteristics. Therefore, a lithium-philic film may be formed on the metal porous body so that the metal porous body has lithium-philic characteristics.

The lithium-philic film may include at least one of an oxide, silicon, aluminum, or gold. At this time, the oxide may include a material having lithium-philic properties, such as NiO, $Ni_2O_3$, ZnO, $Al_2O_3$, $FeO_2$, and $Fe_2O_3$.

The lithium-philic film may be formed on the surface of the metal porous body, that is, on a surface of the pores of the metal porous body. The lithium-philic film may be formed through heat treatment, plasma deposition, or chemical vapor deposition (CVD).

The anode 10 may be manufactured by impregnating the metal porous body with the lithium-philic film formed on a surface with molten lithium. The molten lithium may be impregnated into the pores of the metal porous body. The metal porous body with improved lithium impregnation characteristics due to the lithium-philic film may retain lithium well. Therefore, even if the lithium metal battery 1 is exposed to a high-temperature environment and lithium melts, the lithium flowing out may be minimized or prevented, thereby improving the safety of the lithium metal battery 1.

The anode 10 according to an embodiment uses the metal porous body together with lithium metal, thereby improving electrical conductivity and reducing electrochemical impedance. Therefore, the charge/discharge characteristics of the lithium metal battery 1 including such an anode 10 may be improved.

In addition, when the lithium metal battery 1 is charged/discharged, lithium ions are deposited or desorbed while moving through the pores of the metal porous body. At this time, the metal porous body acts as a support, thereby solving the problem of rapid volume change of the anode 10 of the lithium metal battery 1.

In addition, the anode 10 including the metal porous body as described above may improve electrical conductivity, and thus, the generation of lithium dendrites is suppressed by uniformly dispersing lithium flux.

The anode current collector 15 may act as a moving passage for electrons during charging/discharging of the battery. Therefore, the anode 10 may be arranged on one side of the anode current collector 15.

In one embodiment, the anode current collector 15 may include titanium. If an aqueous electrolyte is used, safety may further be improved by using the anode current collector 15 including titanium. However, the present disclosure is not limited thereto. In one embodiment, the anode current collector 15 may have a thickness in a range from about 10 μm to about 30 μm.

The cathode 20 may include a cathode active material, a binder, and a conductive agent. In one embodiment, a ternary cathode active material including nickel, cobalt, and manganese may be used as the cathode active material.

In one embodiment, the cathode active material may be a NCM 811 ternary cathode active material. In one embodiment, the binder may include polyvinylidene fluoride (PVDF). In one embodiment, the conductive agent may include a carbon-based conductive agent.

However, the present disclosure is not limited thereto. The cathode active material, binder, and conductive material included in the cathode 20 may be appropriately selected and used by a person skilled in the art from materials known in the relevant technical field.

The cathode current collector 25 may act as a moving passage for electrons during charging and discharging of the battery. Therefore, the cathode 20 may be placed on one side of the cathode current collector 25.

In one embodiment, the cathode current collector 25 may include aluminum. However, the present disclosure is not limited thereto. In one embodiment, the cathode current collector 25 may have a thickness in a range from about 10 μm to about 30 μm.

The separator 30 may separate the anode 10 and the cathode 20 and provide a passage for lithium ions to move. In one embodiment, the separator 30 may be placed between the anode 10 and the cathode 20.

The electrolyte (40) may be a configuration that allows lithium ions to move between the negative electrode (10) and the positive electrode (20).

After the anode 10, the cathode 20, and the separator 30 are placed in a case (not shown) such as a pouch, the electrolyte 40 may be injected. Therefore, the electrolyte 40 may be impregnated into all or part of the anode 10, the cathode 20, and the separator 30.

In one embodiment, the electrolyte 40 may be an organic electrolyte or a non-aqueous electrolyte. In one embodiment, the organic electrolyte may include an organic solvent, such as ethylene carbonate (EC): ethylmethyl carbonate (EMC), and dimethyl carbonate (DMC), and a lithium salt (($LiPF_6$, $LiBF_4$, etc.). In one embodiment, the organic electrolyte may be an electrolyte in which a lithium salt, $LiPF_6$, is mixed in an organic solvent of EC:EMC (1:1 vol %). In addition, vinylene carbonate (VC) and fluoroethylene carbonate (FEC) may be additionally mixed into the organic electrolyte.

In one embodiment, the electrolyte 40 may be an aqueous electrolyte. Water ($H_2O$) included in the aqueous electrolyte may have a high relative permittivity and low viscosity compared to the organic solvent. Therefore, the aqueous electrolyte may have excellent safety because it has a lower risk of ignition compared to the organic solvent.

In one embodiment, the aqueous electrolyte may include a high concentration of lithium salt dissolved in water to expand a potential window. For example, the aqueous electrolyte may include a material in which lithium bis (trifluoromethanesulfonyl) imide (LiTFSI) and lithium trifluoromethanesulfonate (LiOTf) are dissolved in water. In this case, lithium salt surrounds the water molecules, and thus, the potential window may be expanded and the electrochemical characteristics of the electrolyte 40 may be improved while ensuring safety.

In one embodiment, the aqueous electrolyte may include a high concentration of lithium salt dissolved in water and an organic solvent or an ionic liquid. In one embodiment, the organic solvent may include DMC or trimethyl phosphate (TMP). In one embodiment, the ionic liquid may include EMIM-TFSI.

By mixing such an organic solvent, the formation of a solid electrolyte interphase layer (SEI) on a surface of the anode may be enhanced, or the ionic conductivity of the aqueous electrolyte may be improved by mixing the ionic liquid. In particular, trimethyl phosphate is an organic solvent with flame retardant properties, and may improve the safety of the aqueous electrolyte.

In one embodiment, if the aqueous electrolyte includes LiTFSI and LiOTf, the aqueous electrolyte may include LiTFSI in a range from about 70 wt % to about 80 wt %, LiOTf in a range from about 10 wt % to about 20 wt %, and water in a range from about 10 wt % to about 20 wt % based on the total weight of the aqueous electrolyte.

In one embodiment, if the aqueous electrolyte includes LiTFSI and DMC, the aqueous electrolyte may include LiTFSI in a range from about 70 wt % to about 80 wt %, DMC in a range from about 10 wt % to about 20 wt %, and water in a range from about 5 wt % to about 15 wt % based on the total weight of the aqueous electrolyte.

In one embodiment, if the aqueous electrolyte includes LiTFSI and TMP, the aqueous electrolyte may include LiTFSI in a range from about 70 wt % to about 80 wt %, TMP in a range from about 15 wt % to about 25 wt %, and water in a range from about 5 wt % to about 10 wt % based on the total weight of the aqueous electrolyte.

In one embodiment, when the aqueous electrolyte includes LiTFSI, LiOTf, and EMIM-TFSI, the aqueous electrolyte may include LiTFSI in a range from about 40 wt % to about 60 wt %, LiOTf in a range from about 5 wt % to about 15 wt %, EMIM-TFSI in a range from about 30 wt % to about 40 wt %, and water in a range from about 5 wt % to about 15 wt % based on the total weight of the aqueous electrolyte.

Figure 3:
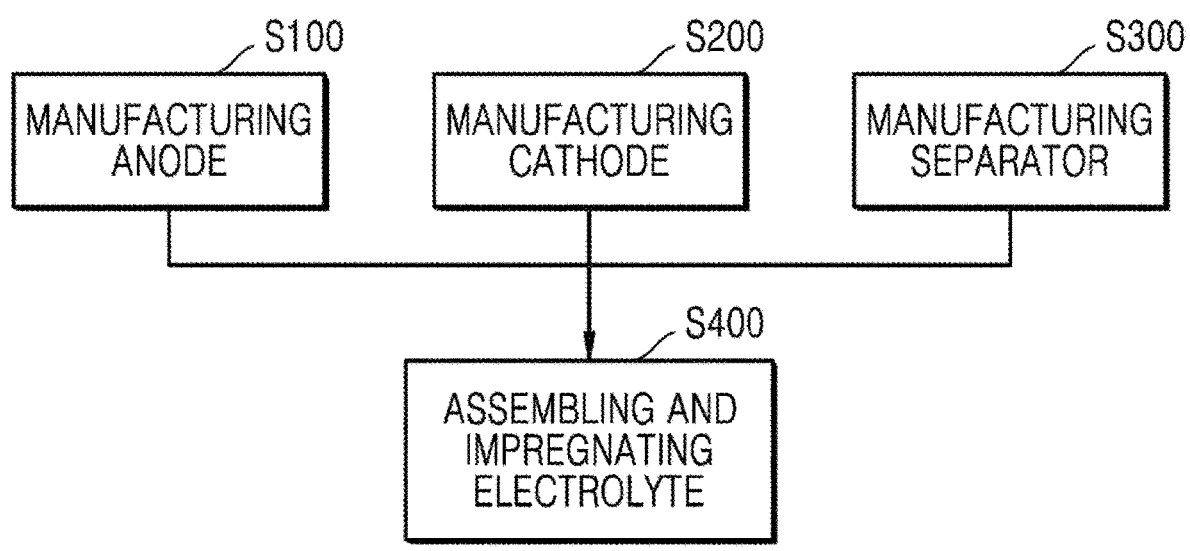
FIG. 3 is a flow chart showing a method of manufacturing a lithium metal battery according to an embodiment.

Hereinafter, a method of manufacturing a lithium metal battery 1 according to an embodiment will be described. FIG. 3 is a flow chart showing a method of manufacturing the lithium metal battery 1 according to an embodiment, and FIG. 4 is a flow chart showing a method of manufacturing the anode 10 according to one embodiment.

Figure 4:
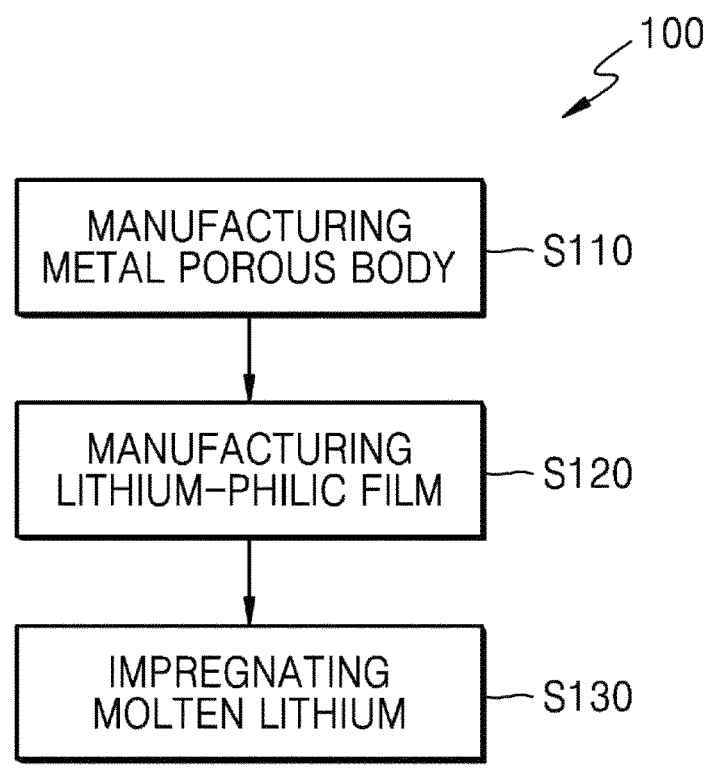
FIG. 4 is a flow chart showing a method of manufacturing an anode according to an embodiment.

Referring to FIG. 3 and FIG. 4, the method of manufacturing the lithium metal battery 1 according to one embodiment may include manufacturing an anode (S100), manufacturing a cathode (S200), manufacturing a separator (S300), and assembling the manufactured anode, cathode, and separator and injecting an electrolyte (S400).

The operation of manufacturing the anode (S100), the operation of manufacturing the cathode (S200), and the operation of manufacturing the separator (S300) may not be performed in order.

The manufacturing of the anode (S100) may include manufacturing a metal porous body (S110), manufacturing a lithium-philic film (S120), and impregnating a molten lithium (S130).

In the operation of manufacturing the metal porous body (S110), a metal porous body that acts as a support for impregnating lithium may be manufactured. The metal porous body may include at least one of nickel, chromium, aluminum, iron, and molybdenum.

In one embodiment, the metal porous body may be manufactured to include nickel in a range from about 20 wt % to about 50 wt %, iron in a range from about 5 wt % to about 20 wt %, chromium in a range from about 15 wt % to about 35 wt %, and aluminum in a range from about 10 wt % to about 30 wt % based on the total weight of the metal porous body. At this time, trace amounts of components such as oxygen may inevitably be included.

In one embodiment, the metal porous body may be manufactured to include nickel in a range from about 40 wt % to about 55 wt %, chromium in a range from about 20 wt % to about 30 wt %, and aluminum in a range from about 20 wt % to about 30 wt % based on the total weight of the metal porous body. At this time, trace amounts of components such as oxygen may inevitably be included.

An average size of the pores of the metal porous body may be manufactured to be in a range from about 10 µm to about 3,000 µm. Preferably, the average size of the pores of the metal porous body may be manufactured to be in a range from about 200 µm to about 600 µm.

Thereafter, an operation of manufacturing a lithium-philic film on a surface of the metal porous body may be performed (S120).

In one embodiment, the lithium-philic film may be formed by heat-treating the metal porous body at a temperature in a range from about 400° C. to about 900° C. In this case, the formed lithium-philic film may include an element included in the metal porous body.

The heat treatment time may vary depending on a component included in the metal porous body. In one embodiment, the heat treatment time may be in a range from about 2 minutes to about 10 minutes.

In the case of forming the lithium-philic film including a heterogeneous element that is not included in the metal porous body, the lithium-philic film may be formed using plasma deposition or CVD.

The thickness of the formed lithium-philic film may be in a range from about 100 nm to about 300 nm. The thickness of the lithium-philic film may be controlled by the temperature of the heat treatment and time.

After forming the lithium-philic film on the metal porous body, the impregnation of molten lithium (S130) may be performed. When preparing molten lithium, lithium may be melted under an inert atmosphere blocked from air. In this case, if the inert atmosphere is formed by using nitrogen, nitrogen may explosively react with lithium to form $Li_3N$. Therefore, when lithium is melted in the operation of the impregnation of molten lithium (S130), the inert atmosphere may be created using pure argon.

After creating the inert atmosphere, lithium may be heated to about 350° C. to about 400° C. to create molten lithium.

Then, by immersing the metal porous body having a lithium-philic film formed on a surface of molten lithium, the molten lithium may be impregnated into the metal porous body.

Figure 5:
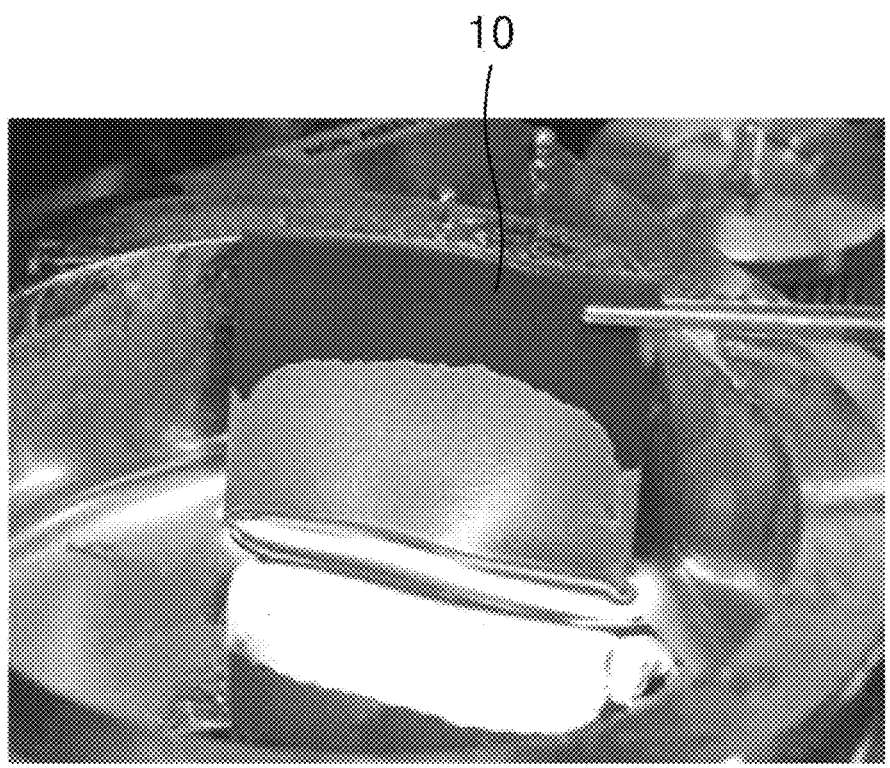
FIG. 5 is a diagram showing impregnation of molten lithium into a metal porous body in a molten lithium impregnation operation according to an embodiment.

FIG. 5 is a diagram showing the impregnation of molten lithium into a metal porous body in a molten lithium impregnation operation according to an embodiment. Referring to FIG. 5, it may be confirmed that a state in which molten lithium impregnated on the metal porous body on which the lithium-philic film is formed is well maintained That is, it may be confirmed that the metal porous body on which the lithium-philic film is formed according to one embodiment exhibits excellent lithium retention capacity.

In an operation of manufacturing the cathode (S200), the cathode may be manufactured by mixing a cathode active material, a conductive agent, and a binder. In one embodiment, the cathode active material may be manufactured by using a carbon black conductive agent in the ternary cathode active material and using polyvinylidene fluoride as a binder. However, the present disclosure is not limited thereto.

After forming a slurry by mixing a cathode active material, a conductive agent, and a binder in a solvent, the slurry may be uniformly applied on a cathode current collector, and then vacuum drying may be performed at a temperature in a range from about 80° C. to about 120° C. for about 10 hours to about 20 hours. In one embodiment, the solvent may be N-Methyl-2-pyrrolidone (NMP).

After removing the solvent by vacuum drying, rolling may be performed to flatten an electrode surface.

In the operation of manufacturing the separator (S300) according to one embodiment, the separator may be manufactured by coating ceramic on one side of a polyolefin-based material. For example, a separator may be manufactured by coating alumina on one side of polypropylene. However, the present disclosure is not limited thereto.

The polyolefin-based membrane may be manufactured to a thickness in a range from about 10 µm to about 20 µm, and the ceramic may be coated to a thickness in a range from about 1 µm to about 5 µm.

In the operation of assembling and injection of electrolyte 40 (S400), the manufactured anode, cathode, and separator may be assembled and the electrolyte 40 may be injected.

The separator may be placed between the anode and the cathode, and after placing the anode and the cathode in a battery case, the electrolyte 40 may be injected, and then, the case may be sealed to manufacture a battery.

The electrolyte 40 may be an organic electrolyte or an aqueous electrolyte.

In one embodiment, the electrolyte 40 may be prepared by mixing a lithium salt such as $LiPF_6$, $LiBF_4$, etc., into an organic solvent such as EC:EMC or EC:DMC. At this time, the electrolyte 40 may also be prepared by additionally mixing vinylene carbonate and/or fluoroethylene carbonate.

In one embodiment, the electrolyte 40 may be prepared by dissolving a high-concentration lithium salt in water. In one embodiment, the electrolyte 40 may be prepared by dissolving lithium bis(trifluoromethanesulfonyl)imide (LiTFSI) and/or lithium trifluoromethanesulfonate (LiOTf) in water. At this time, the electrolyte 40 may also be prepared by additionally mixing an organic solvent such as dimethyl carbonate or an ionic liquid such as EMIM-TFSI.

According to the manufacturing method of an embodiment of the disclosure, it is possible to manufacture the anode 10 to prevent a short circuit from occurring due to lithium dendrite growth and also prevent a short circuit from occurring due to lithium melting and flowing out when the battery is exposed to a high temperature environment and the lithium metal battery 1 including the anode 10. In addition, the lithium metal battery 1 with improved safety may be manufactured using an aqueous electrolyte having non-ignition and non-explosion characteristics.

Hereinafter, the present disclosure will be described in more detail through experimental examples. However, the following experimental examples are intended to explain the present disclosure more specifically, and the scope of the present disclosure is not limited by the following experimental examples. The following experimental examples may be appropriately modified and changed by those skilled in the art within the scope of the present disclosure.

Charge/Discharge Test of Lithium Metal Battery

Manufacture of Lithium Metal Unit Cells (1) A metal porous body including 50 wt % of nickel, 25 wt % of chromium, and 25 wt % of aluminum based on the total weight of the metal porous body was manufactured. At this time, an average size of pores of the metal porous body was 400 μm, and the thickness of the metal porous body was 0.2 mm.

(2) The metal porous body was heat-treated in air at 600° C. for 5 minutes to form a 200 nm oxide film.

(3) Lithium was melted at 400° C. in a pure argon atmosphere, and then impregnated into the metal porous body on which the lithium-philic oxide film was formed to manufacture an anode.

(4) A slurry was formed by mixing in a ratio of 90 wt % of NCM 811 cathode active material, 5 wt % of carbon black conductive agent (Super C65), and 5 wt % of polyvinylidene fluoride and dissolving in a NMP solvent.

(5) The cathode slurry was applied to one surface of a cathode current collector including aluminum with a thickness of 20 μm, and then vacuum-dried at 100° C. for 12 hours to remove the NMP solvent.

(6) The vacuum-dried cathode was rolled to make a surface flat.

(7) A membrane was manufactured by coating a 3 μm thick alumina on one side of a polypropylene membrane having a thickness of 16 μm.

(8) The manufactured cathode was cut to 3.2 cm×4.2 cm, the anode to 3 cm×4 cm, and the separator to 3.4 cm×4.4 cm, and then the separator was placed between the anode and cathode, stacked, and then placed in a pouch.

(9) Electrolyte in which 1 M $LiPF_6$, 2 wt % vinylene carbonate, and 2 wt % fluoroethylene carbonate are mixed in an EC:EMC (1:1 vol %) organic solvent was injected into a pouch including a stack of a cathode, an anode, and a separator, and vacuum-sealed to manufacture a pouch cell.

(10) The manufactured pouch cell was subjected to a charge test in a constant current CC-constant voltage CV manner and a discharge test in a constant current CC manner. The charge and discharge currents were 0.1 C (5 mA), and the charge test was terminated when the charge current reached 0.1 mA during constant voltage charging at 4.2 V, and the discharge test was terminated at 3.0 V.

Test Results

Figure 6:
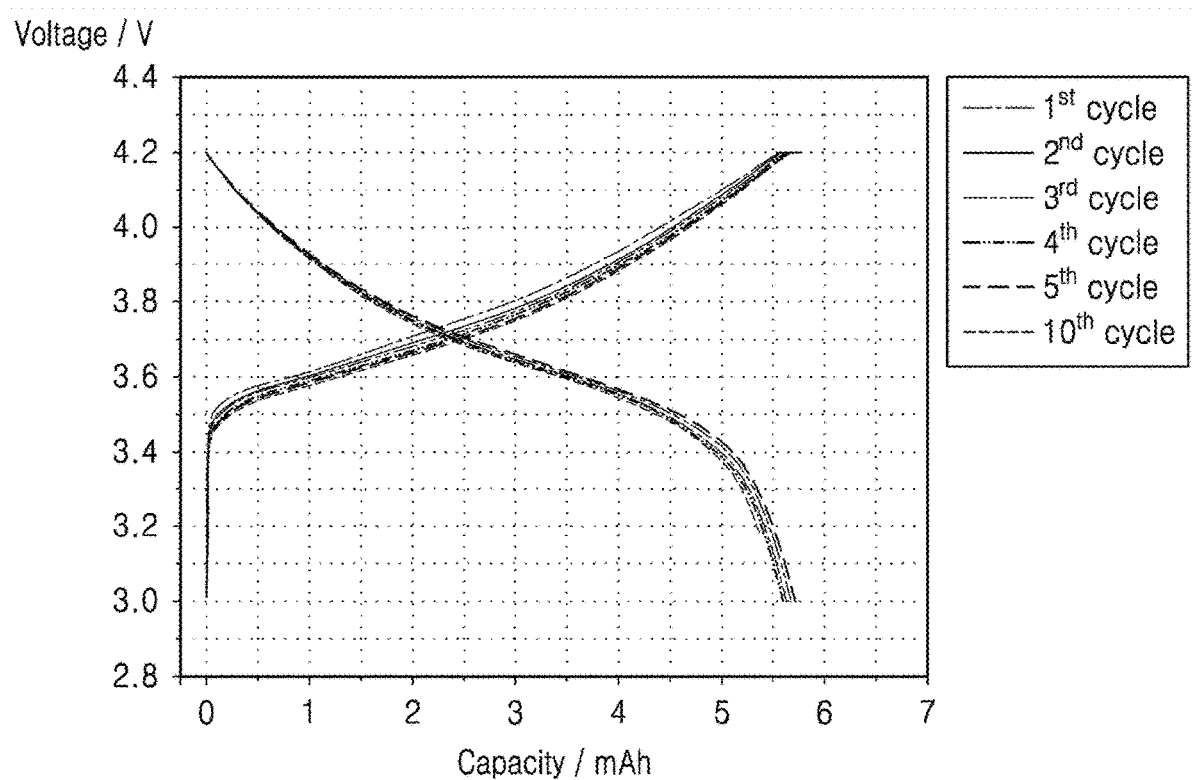
FIG. 6 is a graph showing charge and discharge performance according to a charge and discharge test cycle according to an embodiment.
Figure 7:
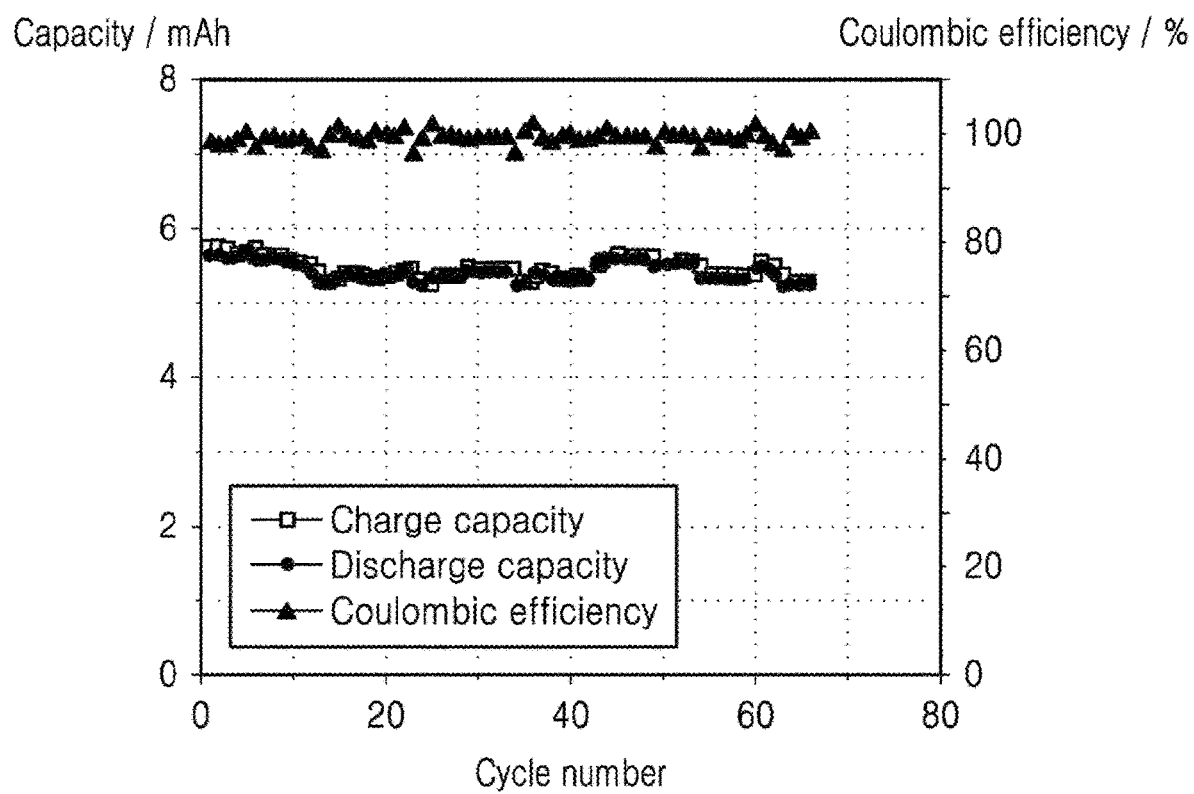
FIG. 7 is a graph showing charge and discharge capacity and faradaic efficiency according to a charge and discharge test cycle according to one embodiment.

FIG. 6 is a graph showing the charge and discharge performance according to the charge and discharge test cycle according to an embodiment, and FIG. 7 is a graph showing the charge and discharge capacity and faradaic efficiency according to the charge and discharge test cycle according to an embodiment.

Referring to FIG. 6, the unit cell according to an embodiment exhibits a charge capacity of about 5.5 mAh when charged from 3.0 V to 4.2 V, and exhibits a capacity of about 5.5 mAh when discharged from 4.2 V to 3.0 V. Also, it may be seen that the charge/discharge graphs are similar up to 10 charge/discharge cycles.

Referring to FIG. 7, it may be confirmed that the unit cell according to an embodiment maintains a capacity of about 5.5 mAh up to about 65 charge/discharge cycles and maintains an efficiency of 100%.

Therefore, when a metal porous body having excellent lithium retention ability and a lithium-philic film formed thereon is used as an anode, a lithium metal battery with excellent electrochemical characteristics while ensuring safety may be manufactured. That is, in the case of a battery using a metal porous body having a lithium-philic film formed according to an embodiment as an anode, it may be confirmed that the growth of lithium dendrites during charge and discharge is suppressed, the generation of dead lithium is reduced, and excellent electrochemical characteristics are exhibited.

Safety Test of Aqueous Electrolyte

Comparative Example

An organic electrolyte was prepared. At this time, the organic electrolyte was prepared by mixing 1 M $LiPF_6$, 2 wt % vinylene carbonate, and 2 wt % fluoroethylene carbonate in EC:EMC (1:1 vol %).

Embodiment 1

An aqueous electrolyte was prepared by dissolving lithium salts (LiTFSI and LiOTf) in water ($H_2O$). At this time, the weight ratio of LiTFSI:LiOTF:$H_2O$ was prepared to be 75:10:15.

Embodiment 2

An aqueous electrolyte was prepared by dissolving lithium salts (LiTFSI) and dimethyl carbonate (DMC) in $H_2O$. At this time, the weight ratio of LiTFSI:DMC:$H_2O$ was prepared to be 75:10:15.

Embodiment 3

An aqueous electrolyte was prepared by dissolving lithium salt (LiTFSI) and trimethyl phosphate (TMP) in $H_2O$. At this time, the weight ratio of LiTFSI:TMP:$H_2O$ was prepared to be 75:20:5.

Embodiment 4

$H_2O$ and EMIM-TFSI were dissolved with lithium salts (LiTFSI and LiOTf) to prepare an aqueous electrolyte. At this time, the weight ratio of LiTFSI:LiOTF:EMIM-TFSI:$H_2O$ was prepared to be 50:10:30:10.

Test Results

Figure 8:
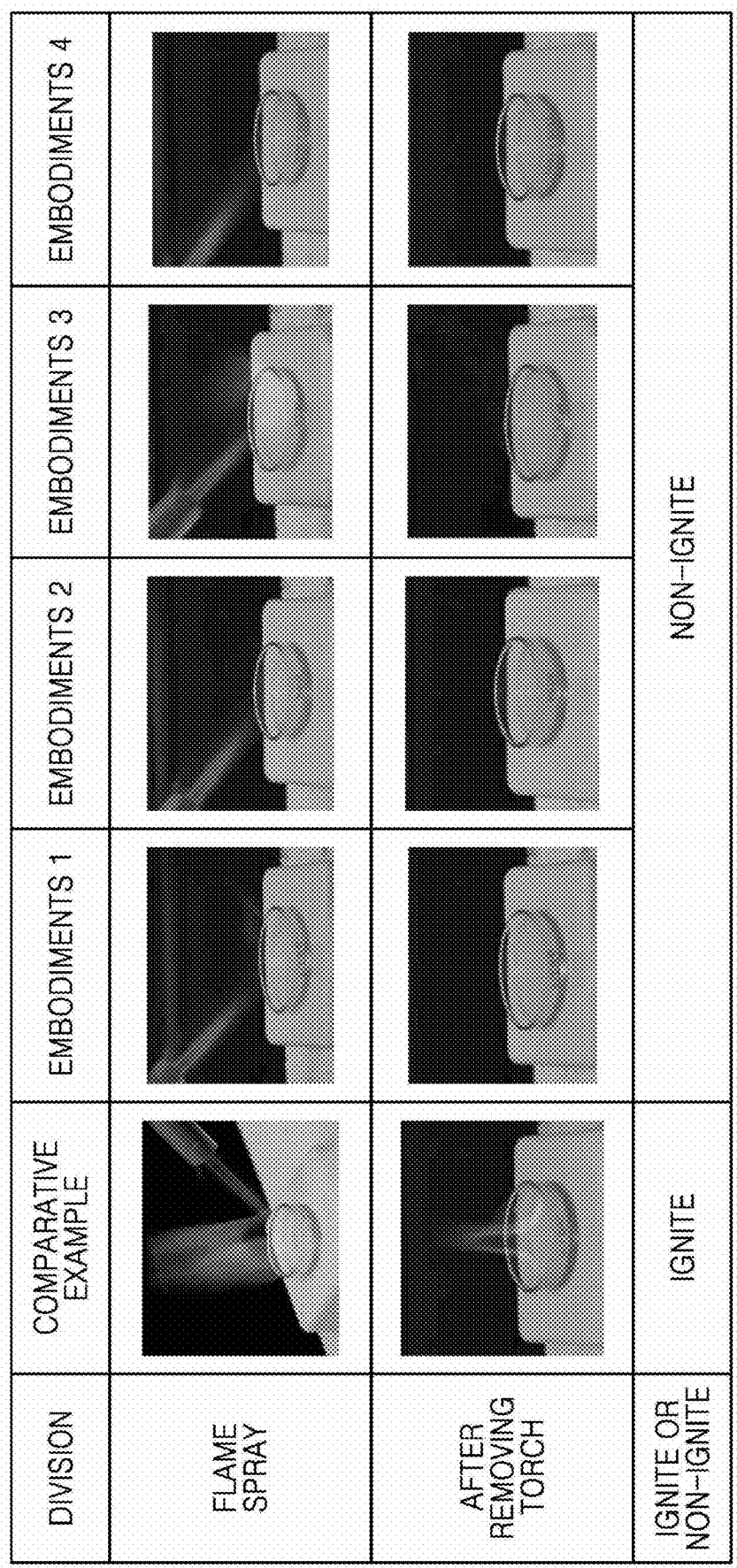
FIG. 8 is a diagram showing results of safety tests according to a Comparative Example and Embodiments.

FIG. 8 is a diagram showing results of safety tests according to Comparative example and Embodiments. At this time, the Comparative example uses an organic electrolyte, and the Embodiments use aqueous electrolytes.

Referring to FIG. 8, in order to confirm the safety of the electrolyte, a flame was sprayed using a torch, and then the torch was removed to confirm an ignition state of each electrolyte.

In the case of the Comparative example, the flame was maintained and combustion occurred even after the torch was removed. On the other hand, it was confirmed that the aqueous electrolytes of Embodiments 1 to 4 did not combust after the torch was removed. Therefore, when the aqueous electrolytes of Embodiments 1 to 4 are used, the stability of the battery may be improved.

According to the embodiments described above, a lithium metal anode having excellent electrochemical performance and improved safety and a lithium metal battery including the same may be manufactured.

Of course, the scope of the disclosure is not limited by these effects, and effects not mentioned may be clearly understood by those skilled in the art to which the disclosure pertains from this specification and the attached drawings.

While the disclosure has been described with reference to the embodiments shown in the drawings, it will be understood by those of ordinary skill in the art that various changes in form and details may be made therein without departing from the spirit and scope of the inventive concept. Accordingly, the scope of the invention is defined not by the detailed description of the invention but by the appended claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A lithium metal battery comprising:
   an anode and a cathode;
   a separator disposed between the anode and the cathode; and
   an aqueous electrolyte impregnated in all or part of the anode, the cathode, and the separator,
   wherein the anode includes a metal porous body having a foam structure, a lithium-philic film formed on a surface of the metal porous body, and lithium impregnated into pores of the metal porous body,
   wherein the metal porous body includes at least one of nickel, chromium, aluminum, iron, and molybdenum, and the lithium-philic film includes at least one of oxide, silicon, aluminum, or gold,
   wherein the metal porous body includes nickel in a range from 40 wt % to 55 wt %, chromium in a range from 20 wt % to 30 wt %, and aluminum in a range from 20 wt % to 30 wt % based on the total weight of the metal porous body, and an average size of the pores of the metal porous body is in a range from 200 μm to 600 μm,
   wherein the cathode includes a ternary cathode active material including nickel, cobalt, and manganese,
   wherein the aqueous electrolyte includes water and lithium salts, and the lithium salts include lithium bis (trifluoromethanesulfonyl) imide (LiTFSI), and the content of the lithium salts are 45 wt % or more based on the total weight of the aqueous electrolyte.

2. The lithium metal battery of claim 1, wherein the aqueous electrolyte includes LiTFSI in a range from 70 wt % to 80 wt %, LiOTf in a range from 10 wt % to 20 wt %, and water in a range from 10 wt % to 20 wt % based on a total weight of the aqueous electrolyte.

3. The lithium metal battery of claim 1, wherein the aqueous electrolyte further includes dimethyl carbonate (DMC) which is an organic solvent,
   wherein the aqueous electrolyte includes LiTFSI in a range from 70 wt % to 80 wt %, DMC in a range from 10 wt % to 20 wt %, and water in a range from 5 wt % to 15 wt % based on a total weight of the aqueous electrolyte.

4. The lithium metal battery of claim 1, wherein the aqueous electrolyte further includes trimethyl phosphate (TMP) which is an organic solvent,
   wherein the aqueous electrolyte includes LiTFSI in a range from 70 wt % to 80 wt %, TMP in a range from 15 wt % to 25 wt %, and water in a range from 5 wt % to 10 wt % based on a total weight of the aqueous electrolyte.

5. The lithium metal battery of claim 1, wherein the aqueous electrolyte further includes EMIM-TFSI which is an ionic liquid,
   wherein the aqueous electrolyte includes LiTFSI in a range from 40 wt % to about 60 wt %, LiOTf in a range from 5 wt % to 15 wt %, EMIM-TFSI in a range from 30 wt % to 40 wt %, and water in a range from 5 wt % to 15 wt % based on a total weight of the aqueous electrolyte.

6. The lithium metal battery of claim 1, further comprising an anode current collector arranged on one side of the anode,
   wherein the anode current collector includes titanium.

7. A method of manufacturing a lithium metal battery, the method comprising:
   manufacturing an anode;
   manufacturing a cathode;
   manufacturing a separator; and
   assembling the manufactured the anode, the cathode, and the separator in a case and injecting an aqueous electrolyte in the case,
   wherein the manufacturing of the anode includes manufacturing a metal porous body, forming a lithium-philic film on a surface of the metal porous body, and impregnating the metal porous body with molten lithium,
   wherein the metal porous body includes at least one of nickel, chromium, aluminum, iron, and molybdenum, and the lithium-philic film includes at least one of oxide, silicon, aluminum, or gold,
   wherein the metal porous body includes nickel in a range from 40 wt % to 55 wt %, chromium in a range from 20 wt % to 30 wt %, and aluminum in a range from 20 wt % to 30 wt % based on the total weight of the metal porous body, and an average size of the pores of the metal porous body is in a range from 200 μm to 600 μm,
   wherein the cathode includes a ternary cathode active material including nickel, cobalt, and manganese,
   wherein the aqueous electrolyte includes water and lithium salts, and the lithium salts include LiTFSI, and the content of the lithium salts are 45 wt % or more based on the total weight of the aqueous electrolyte.

8. The method of claim 7, wherein the metal porous body is heat treated at a temperature in a range from 400° C. to 900° C. to form the lithium-philic film.

9. The method of claim 7, wherein the lithium-philic film is formed using plasma deposition or chemical vapor deposition.

* * * * *